(12) United States Patent
Miller et al.

(10) Patent No.: US 7,957,608 B2
(45) Date of Patent: Jun. 7, 2011

(54) IMAGE CORRECTION ACROSS MULTIPLE SPECTRAL REGIMES

(75) Inventors: John L. Miller, Lake Oswego, OR (US); Cynthia Iseman Archer, Beaverton, OR (US); Milton S. Worley, Lake Oswego, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 12/419,226

(22) Filed: Apr. 6, 2009

(65) Prior Publication Data

US 2009/0274388 A1 Nov. 5, 2009

Related U.S. Application Data

(63) Continuation of application No. 11/207,536, filed on Aug. 19, 2005, now Pat. No. 7,515,767.

(60) Provisional application No. 60/696,299, filed on Jul. 1, 2005.

(51) Int. Cl.
*G06K 9/40* (2006.01)
(52) U.S. Cl. .................... 382/274; 382/191; 382/255
(58) Field of Classification Search .............. 359/337.5, 359/338, 339; 375/267, 299, 347; 382/191, 382/255, 274, 275, 309; 398/81, 147, 148, 398/149, 150, 159
See application file for complete search history.

(56) References Cited

U.S. PATENT DOCUMENTS

| | | | |
|---|---|---|---|
| 5,384,455 A | 1/1995 | Paxman | |
| 5,945,926 A | 8/1999 | Ammar et al. | |
| 6,107,617 A * | 8/2000 | Love et al. | 250/201.9 |
| 6,288,974 B1 * | 9/2001 | Nelson | 367/135 |
| 6,344,640 B1 | 2/2002 | Rhoads | |
| 6,429,415 B1 | 8/2002 | Rhoads | |
| 7,232,999 B1 * | 6/2007 | Otten et al. | 250/338.1 |
| 7,515,767 B2 | 4/2009 | Miller et al. | |
| 2002/0122588 A1 * | 9/2002 | Yamamoto | 382/167 |
| 2002/0176623 A1 * | 11/2002 | Steinberg | 382/165 |
| 2003/0001073 A1 | 1/2003 | Presby et al. | |
| 2003/0062468 A1 * | 4/2003 | Byren et al. | 250/216 |
| 2004/0066959 A1 * | 4/2004 | Pike et al. | 382/128 |

(Continued)

FOREIGN PATENT DOCUMENTS

EP 1907985 4/2008

(Continued)

OTHER PUBLICATIONS

Angel, R., Imaging exoplanets from the ground. ESA special publication SP-539 (2003) [retrieved on Feb. 20, 2007] <http://caao.as.arizona.edu/publications/not_nature11.pdf>.

(Continued)

*Primary Examiner* — Gregory F Cunningham
(74) *Attorney, Agent, or Firm* — Kolisch Hartwell, PC

(57) ABSTRACT

Systems, including apparatus and methods, for obtaining and/or correcting images, particularly from atmospheric and/or other distortions. These corrections may involve, among others, determining corrective information in a first (e.g., visible) wavelength regime, and then applying the corrective information in a second (e.g., longer) wavelength regime, such as infrared (IR) or millimeter-wave (MMW) wavelengths, in real time or with post-processing. For example, these corrections may include scaling a phase diversity correction from one wavelength to another. These systems may be useful in any suitable imaging context, including navigation, targeting, search and rescue, law enforcement, and/or surveillance, among others.

27 Claims, 3 Drawing Sheets

U.S. PATENT DOCUMENTS

2004/0099787 A1* 5/2004 Dolne et al. ............... 250/201.2
2007/0003155 A1 1/2007 Miller et al.

FOREIGN PATENT DOCUMENTS

WO 2007005567 1/2007

OTHER PUBLICATIONS

Caron, J.N. et al., Blind Data Restoration with an Extracted Filter Function. Optics Letters, vol. 26, No. 15, pp. 1164-1166, Aug. 1, 2001.

Löfdahl, Mats G. et al., Fast Phase Diversity Wavefront Sensing for Mirror Control. Adaptive Optical System Technologies, Bonnaccini & Tyson, eds., Proc. SPIE 3353, Mar. 1998.

Löfdahl, Mats G., Phase diversity wavefront sensing and image restoration applied to high-resolution solar observations. Doctoral Thesis, Stockholm Observatory, Stockholm University (1996), S-106 91 Stockholm, Sweden Oct. 31, 2002 [retrieved on Feb. 20, 2007] <http://www.solarphysics.kva.se/~mats/publications/dissertation.html>.

Paxman, R.G. et al., Joint Estimate of Object and Aberrations by Using Phase Diversity. J. Opt. Soc. Am. A., vol. 9, No. 7, pp. 1072-1085, Jul. 1992.

Paxman, R.G. et al., Optical Misalignment Sensing and Image Reconstruction Using Phase Diversity. J. Opt. Soc. Am. A., vol. 5, No. 6, pp. 914-923 Jun. 1988.

Tritschler, A. et al. Sunspot photometry with phase diversity. I. Methods and global sunspot parameters. Astronomy & Astrophysics, v.382, p. 1093-1105 (2002) (online), Feb. 2002 [retrieved on Feb. 20, 2007]. <http://www.aanda.org/articles/aa/pdf/2002/06/aah2863.pdf>.

Vogel, Curtis R. et al., Fast Algorithms for Phase Diversity-Based Blind Deconvolution. Joint study of Montana State University, University of California at Los Angeles, and Wake Forest University; undated copy, 1998.

Wang, Guanghua, Application of Image Restoration Techniques in Flow Scalar Imaging Experiments, Spring 2003, Center for Aeromechanics Research Department of aerospace Engineering and Engineering Mechanics. The University of Texas at Austin [retrieved from the Internet on May 18, 2008] <http://users.ece.utexas.edu/~bevans/courses/ee381k/>.

Young, Lee W., Authorized officer, International Searching Authority, International Search Report, International Application No. PCT/US2006/25504, search date: Feb. 20, 2007.

Young, Lee W., Authorized officer, International Searching Authority, Written Opinion of the International Searching Authority, International Application No. PCT/US2006/25504, opinion completion date: Feb. 20, 2007.

* cited by examiner

IMAGE CORRECTION ACROSS MULTIPLE SPECTRAL REGIMES

CROSS-REFERENCE TO RELATED APPLICATION

This application is a continuation of U.S. patent application Ser. No. 11/207,536, filed Aug. 19, 2005, now U.S. Pat. No. 7,515,767, which in turn is based upon and claims the benefit under 35 U.S.C. §119(e) of U.S. Provisional Patent Application Ser. No. 60/696,299, filed Jul. 1, 2005. These applications are incorporated herein by reference in their entireties for all purposes.

INTRODUCTION

Optical systems may be used to form and/or record images of objects and/or scenes. Unfortunately, when an optical system obtains images based on image data that have passed through a medium, the images obtained generally will be distorted both by the medium, and by the components of the optical system itself. For example, the image of an object viewed with a telescope or other long-range imaging system may be distorted both by atmospheric effects (e.g., the scintillation, convection, turbulence, scatter, and varying index of refraction of the atmosphere, among others, which can induce various spatial and temporal perturbations in the incoming wavefront, etc.), and by mechanical, thermal, and optical limitations of the instrument (e.g., path-length error introduced by out-of-focus components of the field of view, limitations on the collection of spatial frequencies imposed by the objective aperture, uncorrected aberration in the objective lens, mirror deformations generated by supporting devices, etc.). These distortions occur, for example, when ground-based telescopes (or other imaging instruments) obtain images of objects on the ground, in the air, or in space, and when airborne or space-based telescopes (or other imaging instruments) in aircraft or on satellites obtain images of objects within Earth's atmosphere, such as objects on or near Earth's surface. This also may occur in situations in which an imaging system and the object to be imaged are separated primarily horizontally, or both horizontally and vertically, by a portion of the Earth's atmosphere.

The effects of atmospheric distortion can significantly limit image resolution. For example, atmospheric distortion can limit the best "seeing conditions" to approximately 1 microradian at high-altitude astronomical observatories, looking straight up. The limiting resolution becomes rapidly worse for lower-altitude and near-horizontal viewing scenarios typical for cameras and electro-optical systems.

Various methods have been developed to mitigate or eliminate the effects of image distortion. These methods generally rely on obtaining corrective information within the wavelength regime(s) in which imaging data is desired. For example, visible image data are used to correct visible images, and infrared image data are used to correct infrared images. However, this may be prohibitively expensive—or otherwise impractical—as a technique to correct relatively long-wavelength images, statically or in real time, due in part to the difficulty and expense of rapidly collecting and processing image data in such regimes, including the additional hardware complexity needed for the infrared. This is especially true with phase diversity techniques, which may use multiple images to obtain the needed image correction information. In such cases, a need exists for an effective and practical means of eliminating, or at least mitigating, atmospheric distortion effects.

SUMMARY

The present teachings provide systems, including apparatus and methods, for obtaining and/or correcting images, particularly from atmospheric and/or other distortions. These corrections may involve, among others, determining corrective information in a first (e.g., visible) wavelength regime, and then applying the corrective information in a second (e.g., longer) wavelength regime, such as infrared (IR) or millimeter-wave (MMW) wavelengths, in real time or with post-processing. For example, these corrections may include scaling a phase diversity correction from one wavelength to another. These systems may be useful in any suitable imaging context, including navigation, targeting, search and rescue, law enforcement, and/or surveillance, among others.

DEFINITIONS

Figure 1:
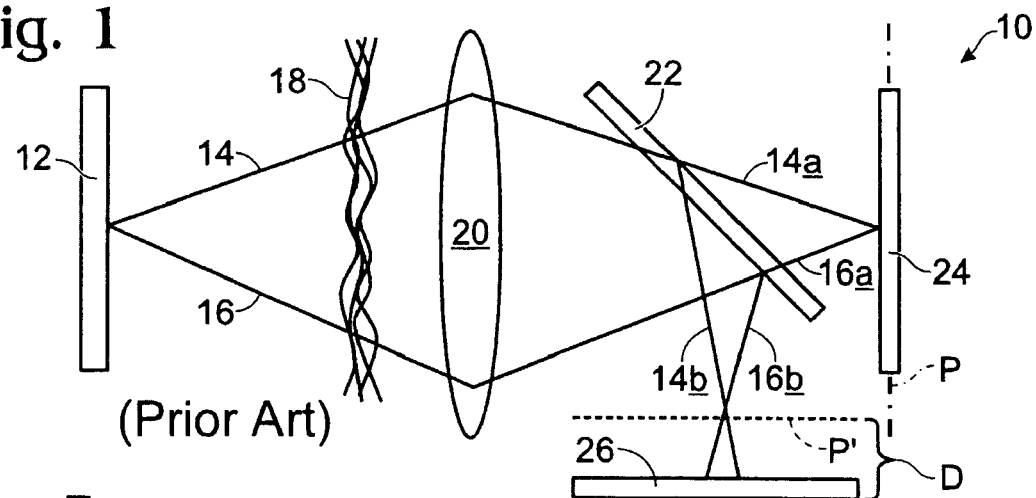
FIG. 1 is a schematic diagram showing visible light from an object being split into two phase diverse beams in preparation for correcting a visible image using the phase diversity method of blind deconvolution.

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation. Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light. Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation. Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared, particularly portions in the far or thermal IR having wavelengths between about 0.1 and 1 mm, may alternatively, or in addition, be termed millimeter-wave (MMV) wavelengths.

DETAILED DESCRIPTION

The present teachings relate to systems, including apparatus and methods, for obtaining images and/or correcting images, particularly from atmospheric and/or other wavefront errors and distortions. Obtaining images, as used herein, may include optically forming a duplicate, counterpart, and/or other representative reproduction of an object or scene, especially using a mirror (reflective optic) and/or lens (refractive optic). The duplicate, counterpart, and/or reproduction, in turn, may be detected, in analog or digital formats, especially using analog (e.g., film) and/or digital (e.g., focal plane arrays) recording mechanisms. Correcting images, as used herein, may include determining corrective information at a first wavelength, or range of wavelengths, and then applying the corrective information to an image at a second wavelength, or range of wavelengths, in real time or with post-processing. The first wavelength, or range of wavelengths, may include relatively shorter wavelengths, such as visible light, among others. The second wavelength, or range of wavelengths, may include relatively longer wavelengths, such as infrared (IR) and/or millimeter-wave (MMV) wavelengths, among others. The imaged light, at the first and/or second wavelengths, or ranges of wavelengths, optionally may include reflected or scattered illumination light, generated by the imaging system or an associated system for the purpose of enhancing images. For example, illumination light may be used in imaging radar applications, among others.

The correction of images distorted by a medium, such as the Earth's atmosphere, and/or by various optical components of an imaging system, generally can be accomplished using the mathematical principle of deconvolution and/or phase diversity. This principle stems from the notion that for an arbitrary three-dimensional object, an optical imaging system yields an image intensity distribution i(x, y, z) that is the convolution of the object intensity distribution o(x, y, z) with the point spread function (PSF) s(x, y, z) describing blurring of a theoretical point source of light:

$$i(x, y, z) = \int_{-\infty}^{\infty} dx' \int_{-\infty}^{\infty} dy' \int_{-\infty}^{\infty} dz' o(x', y', z') s(x-x', y-y', z-z') \equiv$$
$$o(x, y, z) \otimes s(x, y, z) \text{ (3-}D\text{ case)}, \quad (1)$$

where $\otimes$ is called the convolution operator. The PSF describes how light is spread out or blurred by the medium and/or imaging system due to diffraction and other effects as the light travels between the object and image. The same relationship applies for two-dimensional (i.e., planar) and one-dimensional (i.e., linear) objects, but the convolution equation takes simpler forms:

$$i(x, y) = \int_{-\infty}^{\infty} dx' \int_{-\infty}^{\infty} dy' o(x', y') s(x-x', y-y') \quad (2)$$
$$\equiv o(x, y) \otimes s(x, y) \text{ (2-}D\text{ case)};$$

$$i(x) = \int_{-\infty}^{\infty} dx' o(x') s(x-x') \equiv o(x) \otimes s(x) \text{ (1-}D\text{ case)}. \quad (3)$$

For simplicity, in this disclosure, the spatial dependence hereinafter typically will be omitted from equations; e.g., the convolution operation will be written $$i = o \otimes s, \quad (4)$$

without regard to the number of spatial dimensions.

The goal of deconvolution is to extract an object intensity distribution function o, describing the actual distribution of intensity in an object, from the measured image intensity distribution function i, which may be degraded by environmental and/or instrumental factors, as described above. The convolution theorem of mathematics holds that the Fourier transform of the convolution of two functions is the ordinary product of the Fourier transforms of the functions, i.e., that $$\Gamma(f \otimes g) = \Gamma(f)\Gamma(g), \quad (5)$$

where $\Gamma$ is the Fourier transform operator, defined in one dimension (with suitable generalizations to greater numbers of dimensions) by $$\Gamma(f(x)) = F(\omega) = \frac{1}{\sqrt{2\pi}} \int_{-\infty}^{\infty} f(x) e^{-i\omega x} dx. \quad (6)$$

As a result of this mathematical simplification, deconvolution techniques often are performed in Fourier (or frequency) space. The Fourier transform of the PSF, i.e., $$\Gamma(s(x)) \equiv S(\omega), \quad (7)$$

is sometimes referred to as the optical transfer function (OTF).

The following sections further describe these and other aspects of the present teachings, including, among others, (I) image corrections with known point spread functions, (II) image corrections with unknown point spread functions, (III) image corrections across wavelength regimes, and (IV) examples.

I. Image Corrections with Known Point Spread Functions

In some instances, the PSF may be a known or independently determinable function. This may be the case, for example, when there is a temporally constant medium (so that the PSF can be determined in advance), or when a point-like test object is located or can be placed near the actual object of interest, so that the PSF may be determined from the measurable aberration of the test object. This also may be the case in situations in which it is desirable to perform an approximate or "quick and dirty" deconvolution, for example, based on a calculated or best-guess PSF. In any of these cases, the Fourier transform of Eq. (4) yields $$\Gamma(o) = \frac{\Gamma(i)}{\Gamma(s)}, \tag{8}$$

and taking the inverse Fourier transform, $$o = \Gamma^{-1}\left(\frac{\Gamma(i)}{\Gamma(s)}\right), \tag{9}$$

where the inverse transform is defined by $$\Gamma^{-1}(F) = f(x) = \frac{1}{\sqrt{2\pi}} \int_{-\infty}^{\infty} F(\omega)e^{i\omega x} d\omega. \tag{10}$$

Determining the object intensity distribution function using Eq. (9) is sometimes called direct inverse filtering, and may be a suitable technique when the PSF is known and in the absence of significant noise.

However, even when the PSF is known, a complication may arise when—in addition to optical aberrations arising from the medium and the components of the optical system—system noise is detected as part of the image intensity distribution. In this case, any of Eqs. (1)-(4) may be written $$i = o \otimes s + n, \tag{11}$$

Here, n represents the system noise. If the noise is significant, it may be desirable for a chosen method of deconvolution to account for the noise, as well as the PSF, when determining the object intensity distribution. Using the convolution theorem, the Fourier transform of Eq. (11) is $$\Gamma(i) = \Gamma(o)\Gamma(s) + \Gamma(n), \tag{12}$$

which can be rewritten as $$I(\omega) = O(\omega)S(\omega) + N(\omega), \tag{13}$$

where $I(\omega)$, $O(\omega)$, $S(\omega)$, and $N(\omega)$ are the Fourier transforms of the image intensity distribution function, the object intensity distribution function, the PSF, and the noise, respectively. In this case, the object intensity distribution function may not be accurately recoverable simply by taking the inverse transform of Eq. (12) or (13), and it may be desirable to use other techniques, some of which are described below.

I.A. Wiener Filtering

One technique that may be used in the presence of significant noise, generally known as Wiener filtering, applies a linear, noise-dependent attenuating filter $\Phi(\omega)$ before inverse Fourier transforming to find an estimate for the object intensity distribution function:

$$\hat{o} \approx \Gamma^{-1}\left(\frac{\Phi(\omega)I(\omega)}{S(\omega)}\right). \tag{14}$$

A goal of this technique is to find the optimal filter $\Phi(\omega)$ leading to the best estimate of the object intensity distribution function ô in Eq. (14). One such attenuating filter may be found, for example, by assuming that the object and noise functions (i.e., o and n) are uncorrelated, and then mathematically minimizing the quadratic error between the object estimate ô and the true object o. This minimization leads to a Wiener filter of the form $$\Phi(\omega) = \frac{|I(\omega)^2| - |N(\omega)^2|}{|I(\omega)^2|}. \tag{15}$$

I.B. Richardson-Lucy Algorithm

Another technique that may be used in the presence of noise, commonly known as the Richardson-Lucy (RL) algorithm, maximizes the likelihood function of the object intensity distribution assuming a Poisson distribution for the noise (as is often the case for photon noise). This likelihood function essentially is the probability of measuring the mean intensity of a large number of measurements with a single measurement. The result of maximizing the likelihood function is an iterative algorithm, in which each successive estimate of the object intensity function is computed from the previous estimate until a desired degree of convergence is reached:

$$o^{(n+1)} = o^{(n)}\left(\frac{s \times i}{s \otimes o^{(n)}}\right), \tag{16}$$

Here, the "×" operator in the numerator on the right-hand side represents ordinary multiplication. The initial object function, $o^{(0)}$, typically is the uncorrected image intensity function of a constant mean value.

II. Image Corrections with Unknown Point Spread Functions

When the PSF is unknown and cannot be measured directly, it may be necessary to find both the PSF and the corrected image from the available image data. Techniques for accomplishing this generally are termed methods of "blind deconvolution." In general, blind deconvolution methods use known or estimated information, such as physical constraints on the object intensity distribution function, the noise function, and/or the PSF effectively to reduce the number of unknowns so that the system is soluble.

II.A. Richardson-Lucy Extension Method

One method of blind deconvolution is an extension of the Richard-Lucy (RL) algorithm (described previously) to the case where the PSF is unknown. This method can be used alternatively to estimate the object intensity distribution o and the PSF s. In this approach, the iterative equation for updating the object intensity function is the same as in the RL algorithm, i.e., as given in Eq. (16) above, and the iterative equation for updating the PSF is given by $$s^{(i+1)} = s^{(i)}\{(f^{(i-1)} \times g)/(s^{(i)} \otimes f^{(i)})\} \tag{17}$$

More details on this method of blind deconvolution can be found, for example, in G. R. Ayers and J. C. Dainty, "Iterative Blind Deconvolution Method and its Applications," *Optics Letters* 13 (7), 547-549 (July 1988), which is incorporated herein by reference in its entirety for all purposes.

II.B. Phase Diversity Method

Another method of blind deconvolution is based on the phase diversity of two measured images of the same object. In this technique, one image contains only the unknown aberrations, and another image of the same object is intentionally blurred by an additional known amount. The OTFs of the two images then will have the same magnitude, but different phases:

$$S_1(\omega)=|S_1(\omega)|\exp|i\,\vartheta(\omega)|;\ S_2(\omega)=|S_2(\omega)|\exp|i\,\vartheta(\omega)+\rho(\omega)|, \quad (18)$$

where $\rho(\omega)$ is the phase difference introduced by the intentional defocus, also known as the phase diversity between the two OTFs. The object intensity distribution function may be found by assuming a particular type of noise and then maximizing the likelihood of the distribution function, as will be described below in more detail, in the context of Gaussian and Poisson noise. Additional information about the phase diversity method of blind deconvolution can be found in R. G. Paxman et al., "Optical Misalignment Sensing and Image Reconstruction Using Phase Diversity," *J. Opt. Soc. Am. A* 5 (6), 914-923 (June 1988), which is incorporated herein by reference in its entirety for all purposes.

II.B.1. Gaussian Noise Assumptions

Maximizing the likelihood function of the object intensity distribution function under Gaussian noise assumptions results in a closed-form expression for the object intensity distribution, such that $$O(\omega) = \frac{I_1(\omega)S_1^*(\omega) + I_2(\omega)S_2^*(\omega)}{|S_1(\omega)|^2 + |S_2(\omega)|^2}, \quad (19)$$

where the subscripts on I and S refer to the two different diversity images, and the symbol "*" means complex conjugate. Substituting this solution back into the likelihood equation results in an objective function in which the only unknowns are the PSF aberration parameters. Non-linear optimization techniques, such as gradient search-based algorithms, then can be used to find the PSF. Once the PSF is known, the deblurred image can be recovered using standard techniques, such as the Wiener filtering technique described above. More details on this method of phase diversity blind deconvolution can be found in U.S. Pat. No. 4,309,602 to Gonsalves et al., which is incorporated herein by reference in its entirety for all purposes.

II.B.2. Poisson Noise Assumptions

Another method of phase diversity blind deconvolution uses an expectation maximization algorithm to jointly recover o and s under Poisson noise assumptions. Like the RL algorithm, this method is particularly suitable when the dominant noise component is photon noise. This method iteratively updates the estimated restored image (i.e., the object intensity distribution function) and the estimated PSF, so as to increase the likelihood function at every update. The object intensity distribution function update equation is:

$$o^{(n+1)} = o^{(n)} \frac{(s_1 \times i_1)(s_1 \otimes o^{(n)}) + (s_2 \times i_2)(s_2 \otimes o^{(n)})}{S_1(0) + S_2(0)}. \quad (20)$$

The PSF update equations are found by substituting the current value of the image into the likelihood, and then maximizing with respect to those parameters. The estimates of the object intensity distribution function and the PSFs are updated iteratively, until the change in likelihood from one iteration to the next reaches any suitably small threshold. More details regarding this method may be found, for example, in R. G. Paxman et al., "Joint Estimation of Object and Aberrations by Using Phase Diversity," *J. Opt. Soc. Am. A* 9 (7), 1072-1085 (July 1982), which is incorporated herein by reference in its entirety for all purposes.

FIG. 1 is a schematic diagram illustrating an exemplary optical system, generally indicated at 10, employing the phase diversity method of blind deconvolution. In this diagram, an unknown object 12 transmits, emits, and/or reflects light, two representative rays of which are indicated at 14, 16. These rays pass through a region of unknown turbulence 18, and then through a converging lens 20 of the optical system. Turbulent region 18 may represent, for example, a region of the Earth's atmosphere. More generally, turbulent region 18 may represent any other medium and/or influence having an unknown effect on light from an object. Although only one lens 20 is shown in FIG. 1, the optical system generally may include a plurality of suitable optical components, such as lenses and mirrors, among others.

Lens 20 refracts rays 14, 16, which then reach a beam splitter 22, which splits rays 14, 16 into two sets of rays 14a, 16a and 14b, 16b. Rays 14a, 16a pass with their directions unaffected through the beam splitter, and then converge to form an image 24 in the focal plane P of lens 20, where an image collecting device (not shown) may be positioned. Rays 14b, 16b, on the other hand, are reflected by the beam splitter, converge in the focal plane P' of lens 20, and then diverge to form a diversity image 26 at a position translated a known distance D beyond plane P', where a second image collecting device (not shown) may be positioned. Various methods, including those described previously, among others, may be used to reconstruct the PSF and the corrected image from the two sets of image data 24, 26.

II.C. Additional Method(s)

Other methods of blind deconvolution may be suitable for determining an unknown PSF, in addition to the methods described above. These include, for example, global minimization techniques, among others, such as simulated annealing. More information regarding global minimization can be found in B. C. McCallum, "Blind deconvolution by simulated annealing," *Optics Communication* 75(2), 101-105 (February 1990), which is incorporated herein by reference in its entirety for all purposes.

III. Image Corrections Across Wavelength Regimes

The PSF is generally a wavelength dependent function; thus, applying any technique to correct image aberrations may involve finding the PSF in approximately—or in some cases, exactly—the wavelength regime of the desired image. For example, a visible-range PSF may be used to correct visible-range images, an infrared PSF may be used to correct infrared images, a millimeter-wave PSF may be used to correct millimeter-wave images, and so forth. More specifically, a PSF may be determined for the precise wavelength(s) of the image; for instance, a 630 nanometer (nm) PSF may be determined and used to correct a monochromatic 630 nm image. Precise matching of the PSF to the image in this manner is most feasible when the image is either relatively monochromatic, so that only a single PSF need be determined to correct the image accurately, or has a discrete spectrum, so that a well-defined set of PSFs may be determined and used to correct the image.

In some situations, an imaging system and an object of interest may be at fixed locations with respect to each other, so that the object is available for imaging—and image correction—for a relatively long time, and with a relatively constant medium interposed between the object and the imaging system. In such cases, it may be possible to determine in advance a set, or "library," of PSFs, for various wavelength regimes, which then may be used to correct an image of the object of interest. Even if such a predetermined set of PSFs is not known, time delays attributable to determining a wavelength-specific set of PSFs and correcting an image may be relatively unimportant in these cases.

However, in other situations, such as imaging from ground vehicles, airplanes, or satellites for surveillance or other purposes, the imaging system and the object(s) it seeks to image typically may be in a state of relative motion, so that the nature and degree of image aberration is a (rapidly) changing function of time. Furthermore, in such cases, images may be collected continuously and "on the fly," and it may be desirable to correct aberrations in the images relatively quickly, so that the corrected images may be viewed essentially in real time, i.e., with a relatively insignificant delay between collecting the images and viewing the corresponding corrected images.

One method of accomplishing real time image correction of either static or time-varying aberrations is simply to collect image data in the wavelength regime (or bandwidth) of interest, use the collected data to determine the PSF for that bandwidth, and then relatively quickly apply the PSF to correct the image. This technique may be especially suitable for correcting images in the visible regime, due to the relative ease and low expense of collecting visible image data with image collecting devices such as, for example, infrared focal planes, CMOS image, and charge-coupled devices (CCDs). However, other methods may be more suitable for correcting images in other wavelength regimes, as described below.

Another method of accomplishing real time image correction is to collect image data in one wavelength regime, use the collected image data to determine corrective information, which also may be termed an image correction factor, for that regime, modify the image correction factor in a suitable manner, and then apply the modified image correction factor in a different wavelength regime. Suitable image correction factors may include, for example, a PSF determined at a particular wavelength. For instance, visible image data may be collected and used to determine a visible regime PSF, which then may be modified and applied to other (e.g., longer) wavelength regimes. In particular, if the wavefront of the sensing is of a shorter wavelength, the temporal and spatial resolution of the wavefront error will be of higher spatial and higher temporal resolution than that of a longer wavelength, and thus a corrective factor based on the shorter wavelength data can be applied to the longer wavelength data. For instance, visible phase diversity information may be collected in one wavelength regime, appropriately modified (as will be described in more detail below), and then used to obtain a PSF or wavefront correction in another wavelength regime after mathematical modification. Techniques using corrective information from one wavelength regime to correct images in another regime may be especially suitable for correcting images in relatively long wavelength regimes, such as the infrared regime and the millimeter wave regime, since it may be expensive or otherwise impractical to collect and process corrective information in those wavelength regimes simultaneously with imagery data.

Figure 2:
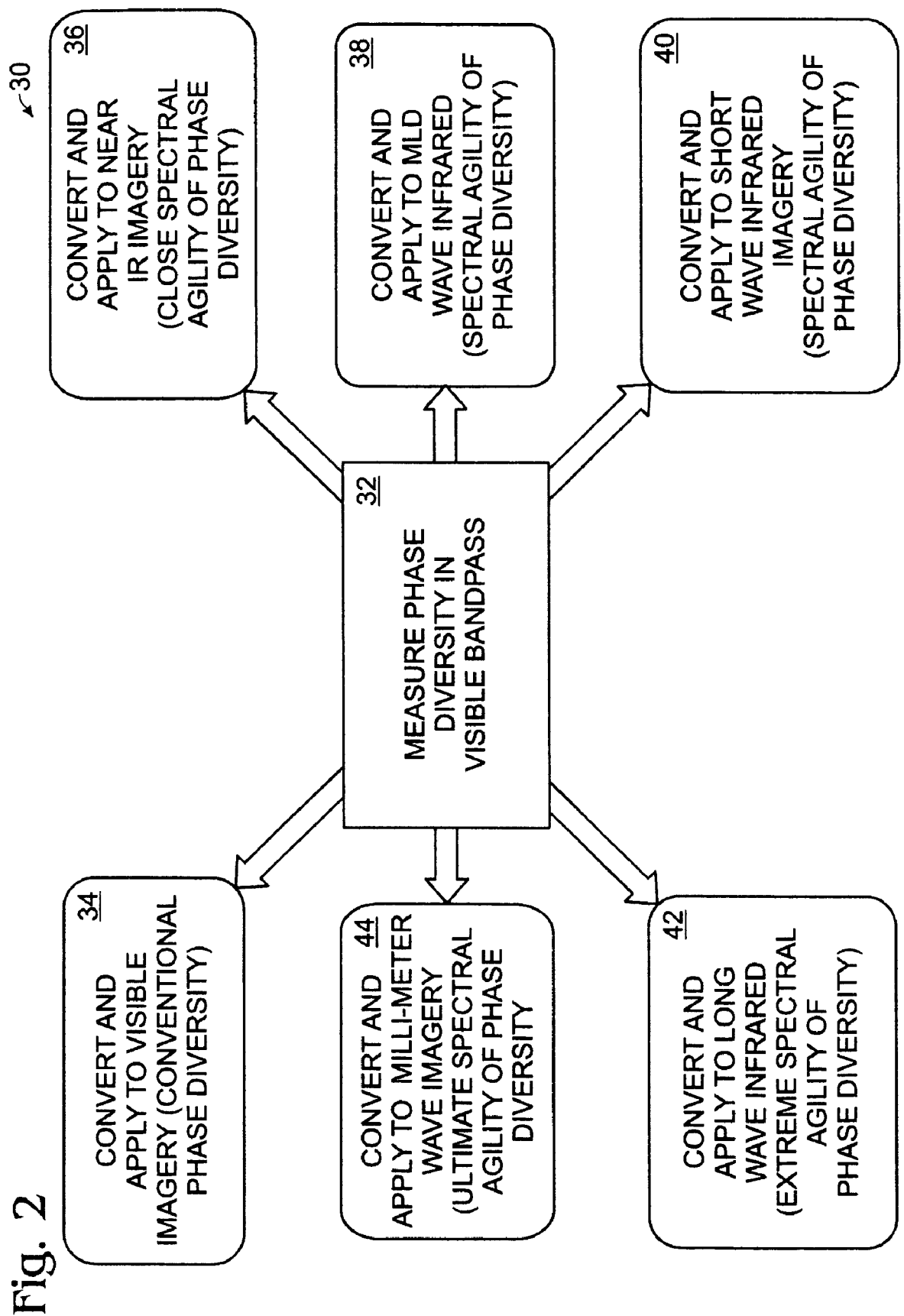
FIG. 2 is a schematic diagram showing how measured phase diversity data may be used to correct imagery in various wavelength regimes.

FIG. 2 is a schematic diagram showing how visible regime image data may be collected and used to determine corrective information, such as phase diversity information, which then may be used to correct images in both the visible regime and in other wavelength regimes. In this approach, generally indicated at 30, an optical system measures corrective information in the visible regime, as indicated at 32. Then, as indicated at 34, this corrective information may be applied in the visible regime itself, to correct visible light images, in a conventional use of the corrective information. However, as indicated at 36, 38, 40, the visible regime corrective information also may be suitably converted and then used to correct near-infrared, mid-wave infrared, or short-wave infrared imagery, respectively, illustrating what may be termed "spectral agility" of the corrective information. Furthermore, as indicated at 42, the visible regime corrective information may be converted and applied to correct long-wave infrared imagery, illustrating what may be termed "extreme spectral agility" of the corrective information. Finally, as indicated at 44, the visible regime corrective information may be converted and applied to correct millimeter-wave imagery, illustrating what may be termed "ultimate spectral agility" of the corrective information.

Since corrective information, including the PSF, the OTF, and phase diversity information, is dependent on wavelength, converting such information from one wavelength regime to correct images in another regime typically will involve resealing the information according to wavelength. For example, in the phase diversity method, the phase of each wave-front varies inversely with wavelength, so that for a given amount of translation of diversity image 26 away from focal plane P' in FIG. 1, a different amount of phase shift, and thus a different object intensity distribution, may be determined for each wavelength of interest. More specifically, if the OTFs of the phase diverse images in the visible regime are given by Eq. (18), i.e., $$S_1(\omega)=|S_1(\omega)|\exp|i\,\vartheta(\omega)|;\; S_2(\omega)=|S_2(\omega)|\exp|i\,\vartheta(\omega)+\rho(\omega)|, \tag{21}$$

then the corresponding expressions for the phase shifted OTFs in any other wavelength regime may be estimated as $$S_1'(\omega) = |S_1(\omega)|\exp\left|i\vartheta(\omega)\left(\frac{\lambda_{vis}}{\lambda_{new}}\right)\right|; \tag{22}$$

$$S_2'(\omega) = |S_2(\omega)|\exp\left|(i\vartheta(\omega) + \rho(\omega))\left(\frac{\lambda_{vis}}{\lambda_{new}}\right)\right|,$$

where $\lambda_{vis}$ is the visible wavelength used for the measurement of the phase diverse images, and $\lambda_{new}$ is the new wavelength at which an image correction is desired. These scaled expressions for the OTFs then may be used to determine the corrected object intensity distribution function, using one of the methods described previously, or any other suitable method of phase diversity blind deconvolution.

Similarly, any OTF determined at one wavelength may be used to generate an OTF—and thus a PSF and a corrected image—at any other desired wavelength, by resealing the phase of the OTF according to the ratio of the measured and targeted wavelengths. In other words, for example, any general OTF expression $S(\omega)=|S(\omega)\exp|i\,\vartheta(\omega)|$ obtained from measurements made at one wavelength may be used to generate another OTF at a different wavelength through a transformation of the form $$S'(\omega) = |S(\omega)|\exp\left|i\vartheta(\omega)\left(\frac{\lambda_{old}}{\lambda_{new}}\right)\right|, \tag{23}$$

where $\lambda_{old}$ and $\lambda_{new}$ are the wavelengths at which the OTF is measured initially and estimated subsequently, respectively.

Thus, any suitable method of deconvolution, including methods of blind deconvolution other than phase diversity, such as the RL extension method described above, may be used to determine an OTF and/or a PSF in one wavelength regime, which then may be rescaled according to a transformation of the form given by Eq. (23) to determine an OTF and/or a PSF in any other regime of interest. The rescaled PSF then may be used to correct imagery in the new regime using an suitable method, such as direct inverse filtering, Wiener filtering, or with the RL algorithm, among others.

IV. Examples

The following examples describe selected aspects and embodiments of the present teachings. These aspects and embodiments are included for illustration and are not intended to limit or define the entire scope of the present teachings.

Example 1

This section describes an example of some of the techniques described above; see FIG. 3.

Figure 3:
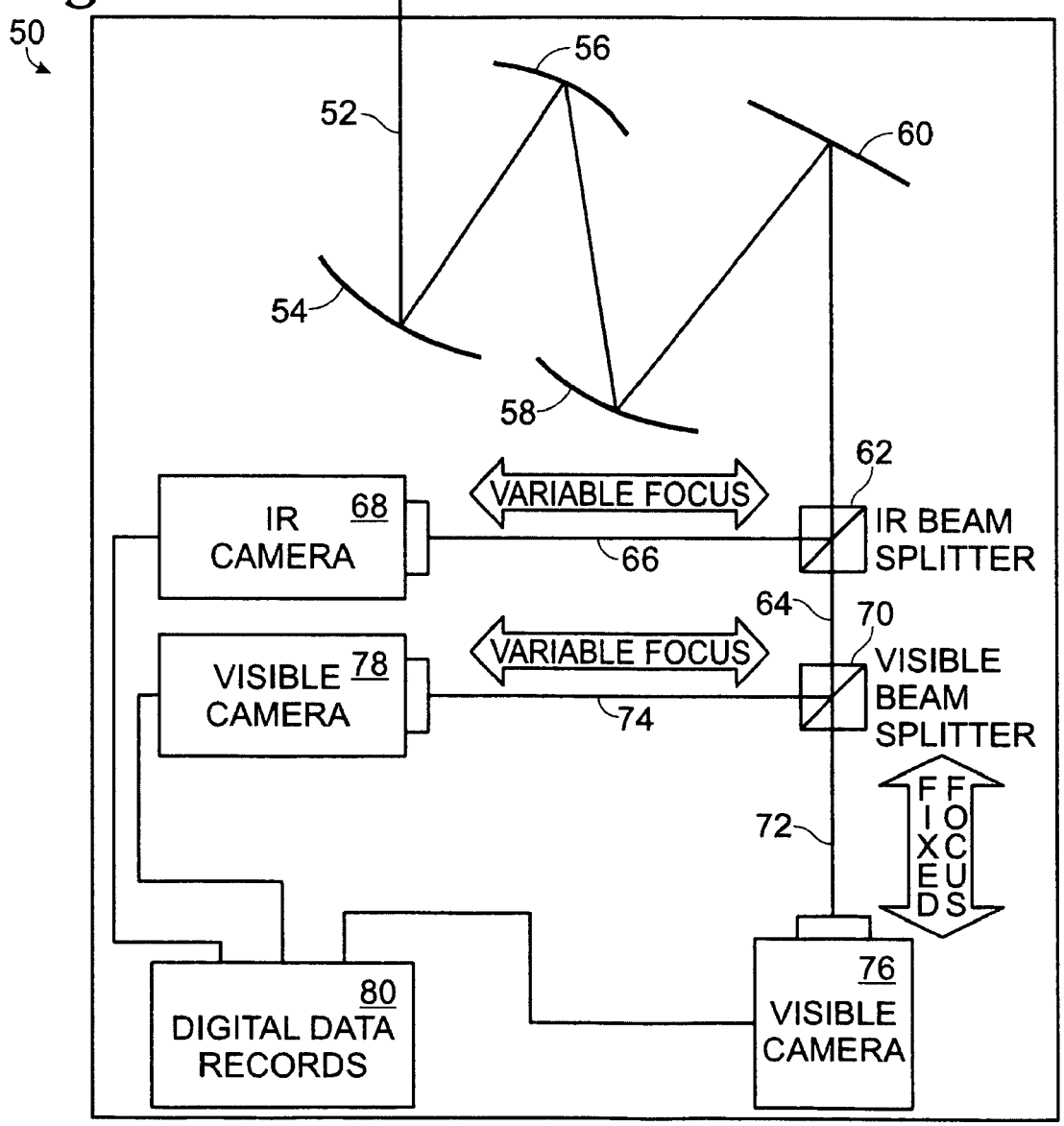
FIG. 3 is a schematic diagram showing image data being split into one primarily infrared beam and two primarily visible phase diverse beams, with the resulting corrective information being processed and used to correct an image formed from the infrared beam, using the phase diversity method of blind deconvolution.

FIG. 3 is a schematic diagram showing an optical system, generally indicated at 50, for using visible image data to correct an infrared image using phase diversity methods. In this example, an incoming image signal 52 arrives at the optical system, and may encounter various optical components including lenses and mirrors, such as mirrors 54, 56, 58, 60. These optical components may be used, for example, to focus, magnify, and/or redirect the incoming signal.

Signal 52 then arrives at a beamsplitter 62, which divides or splits the signal into two beams 64, 66. Beamsplitters, such as beamsplitter 62, generally comprise optical devices configured to separate electromagnetic radiation into different wavelength bands, for example, separating a visible light band from an infrared radiation band. Suitable beamsplitters (such as dichroic or multi-dichroic beamsplitters) may operate by a variety of mechanisms, for example, by transmitting one wavelength band while reflecting another wavelength band, and/or by deflecting or diffracting one wavelength band to a different extent than another wavelength band. Suitable beamsplitters may include prismatic materials, such as fused silica or quartz, and may be coated with a metallic or dielectric layer having wavelength-dependent transmission and reflection properties. Alternatively, or in addition, suitable beamsplitters may include diffractive materials or devices, such as an acousto-optic modulator. In the present example, beamsplitter 62 is configured at least substantially to transmit visible light, and at least substantially to reflect infrared light. Thus, beam 66 passes through the beamsplitter, and contains primarily or exclusively visible wavelengths. Beam 66, on the other hand, is reflected by the beamsplitter, and contains primarily or exclusively only the infrared portion of the signal, which is redirected towards an infrared camera 68.

After passing through beamsplitter 62, beam 64 arrives at a visible beamsplitter 70, which splits beam 64 into two parts, i.e., beams 72, 74, each of which contains a portion of the original visible signal and which may be used as phase diverse beams for applying the phase diversity method of blind deconvolution. In particular, beam 74 is redirected by beamsplitter 70 and arrives at a first visible camera 78 located such that beam 74 produces a focused image in camera 78. Beam 72, however, passes through beamsplitter 70 towards a second visible camera 76, which is configured such that beam 72 produces an out-of-focus image in camera 76 with a known amount of defocus. The two visible images and the phase diversity information then are transmitted to a data recorder/processor 80, which may use this information to correct both the visible imagery detected by camera 78, and also the infrared imagery detected by camera 68. Data recorder/processor 80 may be a single integrated device, such as an integrated circuit board, including both processing and memory capabilities, or it may include a separate but communicating data processor and data recorder, as is most appropriate for a given application.

More specifically, recorder/processor 80 may be programmed with one or more algorithms for determining phase diversity image corrections in the visible and/or the infrared regimes from the phase diverse visible imagery collected by cameras 76 and 78, and these corrections then may be used to correct the imagery in those regimes. The visible regime corrections may be determined directly from the visible phase diverse imagery, and the infrared regime corrections may be determined after rescaling the visible phase diversity information according to wavelength, in the manner of Eq. (22) or (23) above. After such wavelength rescaling (if any), the corrections may be found using any suitable phase diversity deconvolution algorithm, such as, for example, those using Gaussian or Poisson noise assumptions described previously, among others.

After applying the determined corrections to one or both of the visible and infrared imagery, recorder/processor 80 of system 50 may be configured to record the corrected imagery, transmit it to a remote location, and/or send it to one or more "heads-up" displays (not shown) for observation by a pilot or other operator. Determining the corrections, applying them to the imagery, and recording, transmitting, or displaying the corrected imagery all may be performed essentially in real time, so that an operator using system 50 may be able to see corrected imagery in one or both of the visible and infrared wavelength regimes without significant time delays. This may make system 50 particularly useful for surveillance and navigation applications.

The image correction systems described in this example may incorporate more than one distinct algorithm for determining phase diversity image corrections, the results of which may be compared and a preferred method selected to optimize image resolution. In addition, the processing cost of each method may vary according to each specific type of imagery and aberration, and the system may be configured automatically to select the most cost-efficient algorithm for a given situation, or to select an algorithm that balances optimal image resolution with cost-efficiency in a predetermined manner. Furthermore, although in this example visible regime phase diverse images may be used to correct infrared imagery, the system also may be configured to use visible phase diverse images to correct imagery in other wavelength regimes, such as in the millimeter-wave regime, among others. In general, the methods employed by this system may be employed to use phase diverse imagery in any wavelength regime to correct imagery in any other regime.

Example 2

This section describes additional techniques that optionally may be used with, or in lieu of, techniques described elsewhere herein for improving image acquisition and/or quality. See, e.g., U.S. Provisional Patent Application Ser. No. 60/696,306, filed Jul. 1, 2005, which is incorporated herein by reference in its entirety for all purposes.

Kolmogorov developed mathematical constructs for estimating atmospheric effects. In these constructs, the resolution limits imposed by the atmosphere vary with path length (to the 8/5$^{th}$ power), altitude (to the −4/3 power), and sensing wavelength (to the 1/5$^{th}$ power). The temporal effects from the atmosphere also vary approximately with wavelength. Thus, based on these constructs, it is possible to measure the phase diversity and calculate a correction for the wavefront for longer wavelengths. Tilt of the wavefront usually is the dominant wavefront error and can be corrected merely by tilting a flat mirror, for example, as described in U.S. Provisional Patent Application Ser. No. 60/696,306, filed Jul. 1, 2005.

One method to correct for this atmospheric distortion is to employ a wavefront sensor to measure the spatial and temporal phase change on the incoming light, and to use a flexible mirror to remove the measured distortions, in essence removing the atmospheric effects in real time. The wavefront sensor can be a Shack-Hartmann sensor, which is a series of lenslets (or subapertures) that "sample" the incoming wavefront at the size of (or smaller than) the Fried parameter. The size of the wavefront sensor subaperture and the spacing of the actuators that are used to deform an adaptive mirror can be expected to be less than the Fried coherence cell size.

The incoming light for the wavefront sensor can be generated by a laser-induced false star and/or a real star. In such cases, the isoplanatism is significant and often limits the effectiveness of atmospheric compensation. Anisoplanatism may not be a concern for the present teachings as the wavefront effort is measured along the same path length as the sensing.

Example 3

Figure 4:
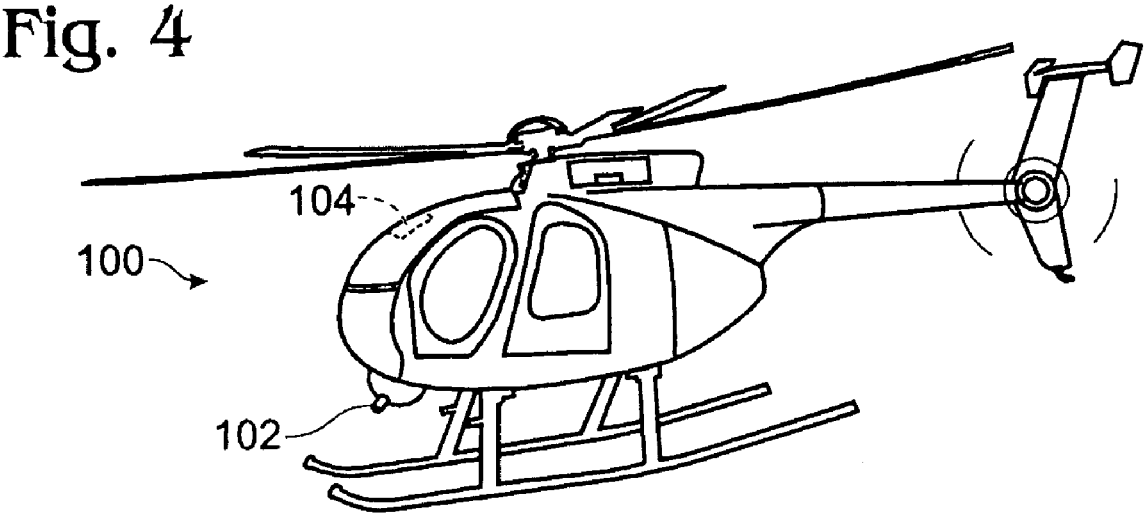
FIG. 4 shows a representative aircraft equipped with an image correction system, according to aspects of the present teachings.

This section provides an example of an image correction system, according to aspects of the present teachings, being used in an aircraft to correct infrared, millimeter-wave, and/or visible imagery in real time; see FIG. 4.

FIG. 4 shows a helicopter 100 equipped with an image correction system 102. Image correction system 102 may be substantially similar or identical to system 50, described above in Example 1 (and optionally augmented by Example 2) and depicted in FIG. 3, and may be configured to correct infrared, millimeter-wave, and/or visible imagery using visible regime phase diverse imagery. The corrected infrared or millimeter-wave imagery may be recorded and/or displayed on a heads-up display, generally indicated at 104 in FIG. 4. Thus, a pilot of helicopter 100 may use system 102 to view corrected infrared or millimeter-wave imagery in real time on display 104. In addition, system 102 may provide a second heads-up display (not shown) configured to display corrected visible imagery, which also may be corrected using the visible phase diverse imagery collected by the system. The image correction systems provided by the present teachings more generally may be configured for use in any suitable type of aircraft or airborne device (among other supports), such as fixed-wing piloted aircraft, pilotless remote-controlled aircraft, and/or orbiting satellites, among others. Suitable support platforms, supports, and mounting devices are described in the following patent applications, which are incorporated herein by reference in their entireties for all purposes: U.S. patent application Ser. No. 10/956,739, filed Oct. 1, 2004; U.S. patent application Ser. No. 10/956,738, filed Oct. 1, 2004; and U.S. Provisional Patent Application Ser. No. 60/696,306, filed Jul. 1, 2005.

Example 4

This example describes exemplary uses and applications of image correction systems, in accordance with aspects of the present teachings.

The image correction systems may be used for, or applied to, any suitable purpose(s), including navigation and/or surveillance, among others. These purposes may involve collecting images at two or more wavelengths. In some cases, images may be observed, processed, and/or analyzed for just one of these wavelengths, for example, by using visible image information to obtain corrective data, applying the corrective data to an infrared image, and then using only the infrared image for subsequent analysis). In other cases, images may be observed, processed, and/or analyzed for two or more wavelengths, for example, separately or collectively (e.g., by forming a composite image). Composite images may be straight combinations of two or more other images. However, in some cases, one or both of the images may be processed prior to or during the process of combining the images. For example, composite images may be formed for use in firefighting, aeronautics, surveillance, and/or the like, superimposing infrared images of hot spots, runway lights, persons, and/or the like on visible images. See, e.g., U.S. Pat. No. 6,232,602, issued May 15, 2001, which is incorporated herein by reference in its entirety for all purposes.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A method of image correction, comprising:
   providing a first image-collecting device, a second image-collecting device, and a data processor:
   collecting a first set of image data and corresponding phase diversity data in a first wavelength regime with the first image-collecting device;
   collecting a second set of image data, without phase diversity data, in a second wavelength regime with the second image-collecting device;
   processing the first set of image data and the phase diversity data to determine an image correction factor for correcting the second set of image data using the data processor; and
   correcting the second set of image data by applying the image correction factor to the second set of image data to obtain a corrected set of image data.

2. The method of claim 1, wherein the step of correcting the second set of image data is performed at least substantially in real time.

3. The method of 1, wherein the first wavelength regime is any regime of shorter wavelength than the second wavelength regime.

4. The method of claim 1, wherein the first wavelength regime is the visible regime.

5. The method of claim 1, wherein the step of processing the first set of image data and the phase diversity data includes processing two phase diverse sets of image data using the phase diversity method of blind deconvolution.

6. The method of claim 1, wherein the step of processing the first set of image data and the phase diversity data includes using the Richardson-Lucy extension method of blind deconvolution.

7. The method of claim 1, wherein the first wavelength regime is characterized by a first wavelength, and the second wavelength regime is characterized by a second wavelength, and wherein the step of processing the first set of image data and the phase diversity data includes rescaling a phase portion of the first set of image data by a function involving the first wavelength and the second wavelength.

8. The method of claim 1, wherein the step of processing the first set of image data and phase diversity data includes using at least two methods of blind deconvolution to determine the image correction factor, and further comprising selecting one of the at least two methods to improve at least one of (A) the resolution of the corrected set of image data, and (B) the processing costs associated with obtaining the corrected set of image data.

9. The method of claim 1, further comprising correcting the first set of image data by applying the image correction factor to the first set of image data to obtain a corrected first set of image data.

10. The method of claim 9, further comprising forming a composite image using the corrected second set of image data and the corrected first set of image data.

11. An image correction system, comprising:
a first image-collecting device for collecting a first set of image data and corresponding phase diversity data in a first wavelength regime;
a second image-collecting device for collecting a second set of image data in a second wavelength regime, wherein the first and second wavelength regimes are substantially nonoverlapping; and
a data processor configured to process the first set of image data and corresponding phase diversity data to determine an image correction factor for the second set of image data, and further configured to obtain a corrected set of image data by applying the image correction factor to the second set of image data.

12. The image correction system of claim 11, wherein the first wavelength regime is any regime of shorter wavelength than the second wavelength regime.

13. The image correction system of claim 11, wherein the first wavelength regime is the visible regime.

14. The image correction system of claim 11, wherein the data processor is configured to process the first set of image data and phase diversity data using a method of blind deconvolution.

15. The image correction system of claim 14, wherein the blind deconvolution method is the Richardson-Lucy extension method of blind deconvolution.

16. The image correction system of claim 11, wherein the data processor is configured to obtain the corrected set of image data at least substantially in real time.

17. The image correction system of claim 11, further comprising an aircraft, wherein the first image collecting device, the second image collecting device, and the data processor are mounted in the aircraft.

18. The image correction system of claim 17, further comprising a heads-up display, mounted in the aircraft, and configured to display the corrected set of image data to an operator of the aircraft.

19. The image collection system of claim 11, wherein the first set of image data arrives at the first image-collecting device after passing through a medium selected from the set comprising water, the atmosphere, and a solids.

20. The image collection system of claim 11, wherein the data processor is configured to correct wavefront errors caused by optical components of the system.

21. The method of claim 1, wherein the first and second wavelength regimes are substantially nonoverlapping.

22. A method of image correction comprising:
providing a first image-collecting device, a second image-collecting device, and a data processor;
configuring the first image-collecting device to collect a first set of image data and corresponding phase diversity data in a first wavelength regime;
configuring the second image-collecting device to collect a second set of image data in a second wavelength regime; and
configuring the data processor to process the first set of image data and the phase diversity data to determine an image correction factor for the second set of image data, and to obtain a corrected set of image data by applying the image correction factor to the second set of image data.

23. The method of claim 22, wherein the step of configuring the data processor includes configuring the data processor to process two phase diverse sets of image data using the phase diversity method of blind deconvolution.

24. The method of claim 22, wherein the step of configuring the data processor includes configuring the data processor to apply the Richardson-Lucy extension method of blind deconvolution.

25. The method of claim 22, wherein the first wavelength regime is characterized by a first wavelength and the second wavelength regime is characterized by a second wavelength, and wherein the step of configuring the data processor includes configuring the data processor to rescale a phase portion of the first set of image data by a function involving the first wavelength and the second wavelength.

26. The method of claim 22, wherein the step of configuring the data processor includes configuring the data processor to determine image correction factors using at least two different methods of blind deconvolution, and to apply the image correction factor corresponding to the method that improves a factor selected from the set consisting of (A) the resolution of the corrected set of image data, and (B) the processing costs associated with obtaining the corrected set of image data.

27. The method of claim 22, further comprising configuring a beam splitter to split an incoming image signal into the first set of image data and the second set of image data.

* * * * *